G. L. BADGER.
INTERNAL COMBUSTION ENGINE.
APPLICATION FILED JAN. 4, 1915.

1,334,010. Patented Mar. 16, 1920.
5 SHEETS—SHEET 5.

Witnesses:
Ernest A. Telfer
Robert H. Kammler

Inventor
George L. Badger
by Munn, Both, Jenney & Kamm
Attys.

UNITED STATES PATENT OFFICE.

GEORGE L. BADGER, OF QUINCY, MASSACHUSETTS.

INTERNAL-COMBUSTION ENGINE.

1,334,010. Specification of Letters Patent. Patented Mar. 16, 1920.

Application filed January 4, 1915. Serial No. 453.

*To all whom it may concern:*

Be it known that I, GEORGE L. BADGER, a citizen of the United States, and a resident of Quincy, Massachusetts, have invented an Improvement in Internal-Combustion Engines, of which the following description, in connection with the accompanying drawings, is a specification, like characters on the drawings representing like parts.

This invention relates to internal combustion engines and among other objects aims to provide a strong, simple, compact construction with high efficiency.

The character of the invention may be best understood by reference to the following description of an illustrative embodiment thereof shown in the accompanying drawings, wherein:

Fig. 6 is an end elevation of the engine shown in Fig. 1 and discloses in vertical section a pump mechanism for feeding fuel to the engine;

Fig. 13 is a section through a cam to be referred to.

The invention is shown herein for purposes of illustration as applied to a two-cycle engine although it will be apparent that some of its features are applicable to four-cycle engines.

Referring to the drawings, the invention there shown comprises four cylinders although the number of cylinders may be varied as desired. Since the cylinders and the mechanism contained therein are similar a description of one will suffice for all.

Figure 1:
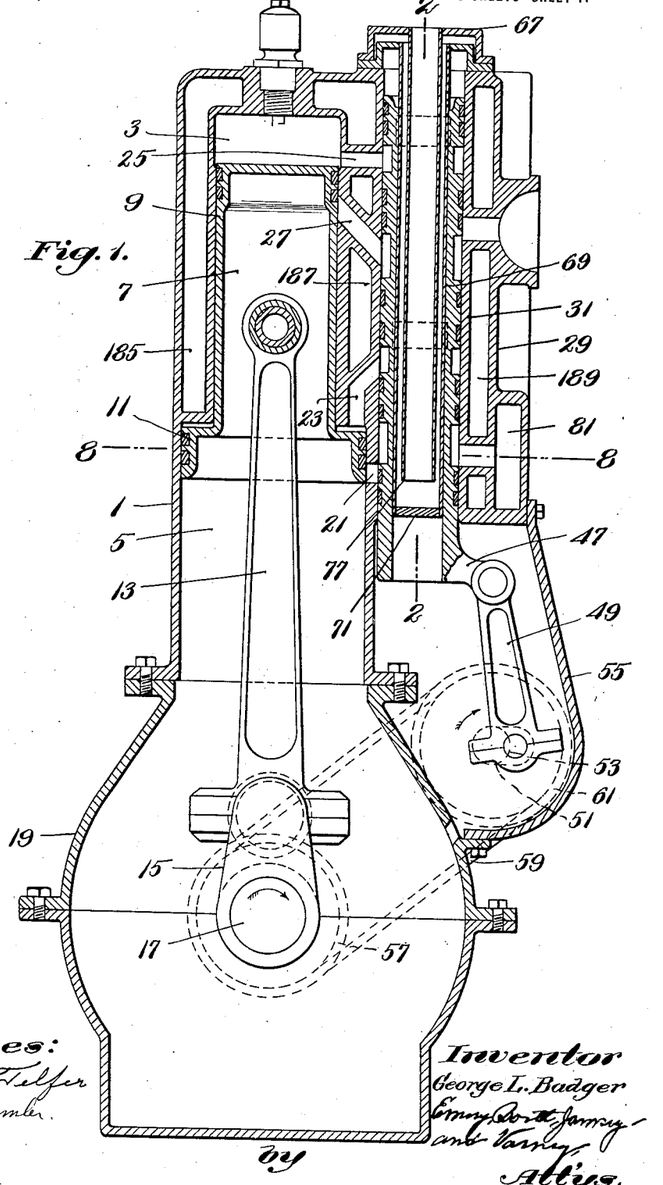
Figure 1 is a vertical section through an illustrative engine shown herein as embodying the invention.

Referring more particularly to Fig. 1,—1 designates a cylinder having an upper portion forming a combustion chamber 3 and a lower portion forming a compression chamber 5. A piston 7 is provided having an upper portion 9 formed to fit the combustion chamber and a lower portion 11 formed to fit the compression chamber. The piston is connected by a rod 13 with a crank 15 on a shaft 17 journaled in suitable bearings in a casing 19 and extending the length of the casing.

The wall of the cylinder is provided with an air inlet port 21 permitting the introduction of air into the compression chamber and a port 23 permitting the discharge of the compressed air from said chamber. It is also provided with a port 25 permitting the admission of compressed air into the combustion chamber 3 and a port 27 permitting the exhaust of the burnt gases from said combustion chamber.

Figure 2:
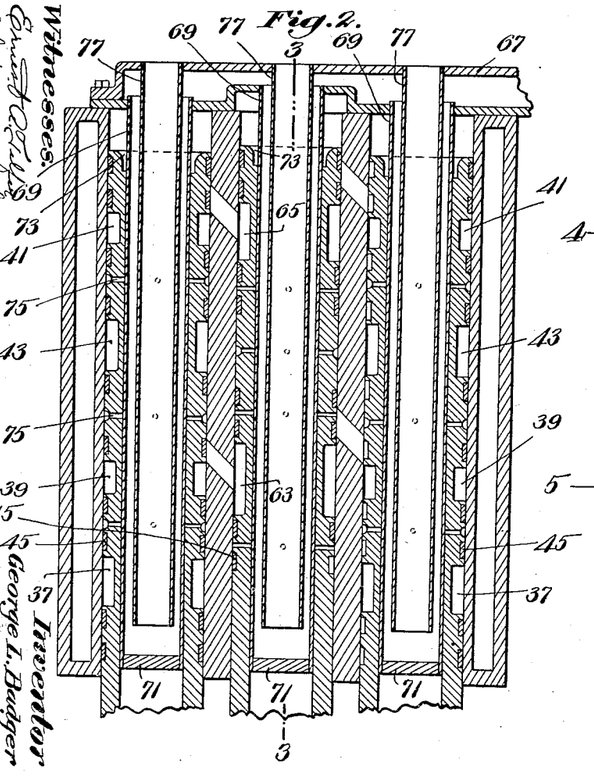
Fig. 2 is a vertical section taken on broken line 2—2 of Fig. 1.
Figure 4:
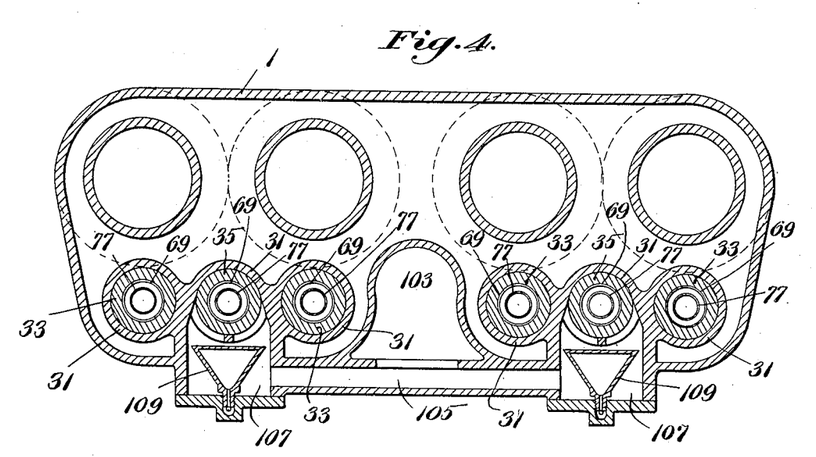
Fig. 4 is a horizontal section taken on line 4—4 of Fig. 3.
Figures 5, 7:
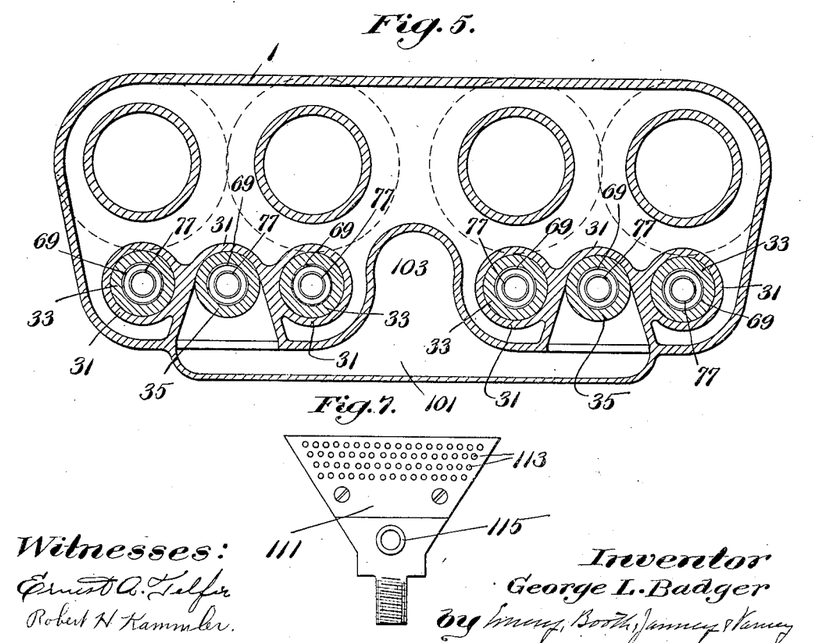
Fig. 5 is a horizontal section taken on line 5—5 of Fig. 3.
Fig. 7 is a plan of a spraying nozzle for delivering fuel to the engine.

Having described the general construction of the cylinders, pistons and their ports, next will be described the valves for controlling the passage of fluid through said ports. To accomplish this a valve casing 29 is provided extending along one side of the engine and conveniently formed integral with the casting containing the cylinders. This valve casing is formed to present six cylinders 31 (Figs. 4 and 5) in groups of three with each group opposite a pair of cylinders 1. These cylinders contain slide valves for controlling the passage of fluid through the cylinder ports and since the groups are similar a description of one will suffice for both. In the outer cylinders of a group are mounted main tubular or piston valves 33 and between them is an auxiliary tubular valve 35. Each main tubular valve is provided with fluid controlling passages typified herein as circumferential grooves or recesses including a groove 37 (Fig. 2) for controlling the admission of air to the inlet port 21 leading to the compression chamber; a circumferential groove 39 for controlling the discharge of compressed air from said chamber through the port 23; a circumferential groove 41 for controlling the admission of compressed air into the combustion chamber 3; and a circumferential groove 43 for controlling the discharge of the burnt gases through the exhaust port 27.

Each of the tubular valves is provided with packing rings 45 distributed at suitable intervals along the length thereof. To reciprocate the valve tubes to control the opening and closing of the ports for the cylinders, each is provided with an ear 47 (Fig. 1) connected by a rod 49 with a crank 51 on a shaft 53 journaled in suitable bearings in a closed casing located beneath the valve casing and at one side of the crank shaft casing 19 and secured thereto. The crank for one of the main valves of a group is set on its shaft 180° from the crank for the other main valve of said group. The valve shaft 53 is turned one complete revolution for each complete revolution of the main shaft 17. To accomplish this a sprocket wheel 57 is mounted fast on an end of the main shaft 17 projecting beyond the casing 19 and is connected by a sprocket chain 59 with a sprocket wheel 61 fast on an end of the valve shaft 53 projecting from the casing 55. The pistons of the two cylinders coöperating with this group of valves are connected to the main shaft 17 by cranks which are set 180° apart. Consequently the valves are operated to produce a power stroke for each of said pistons on each complete rotation of the main shaft.

The valve groove 37 of a tube 33 constitutes the sole control of the admission of the air through the port 21 into the compression chamber and the valve groove 43 constitutes the sole control for the discharge of the burnt gases from the combustion chamber. The valve grooves 39 and 41, however, do not constitute the sole control for the discharge of the compressed air from the compression chamber and the admission of the compressed air to the combustion chamber. The auxiliary valve 35 coöperates with the main valve to accomplish this purpose. To this end said auxiliary valve is provided with a circumferential groove 63 (Fig. 2) substantially opposite to the main valve compressed air discharge groove 39 and the circumferential groove 65 substantially opposite the admission valve groove 41. As stated, the auxiliary valve is reciprocated by a crank on the valve shaft. This crank is set at 45° from the crank for operating one of the main valves. Consequently the auxiliary valve will reciprocate differentially from the main valve. By this arrangement the main valve will move to a position for opening the compressed air discharge port 23 and the admission port 25 leading to the combustion chamber before the movement of the auxiliary valve to bring its ports 63 and 65 in position to complete the opening. Thus the time of the opening of these ports is finally controlled by the auxiliary valve.

The control of the four ports of the cylinder by a main valve and an auxiliary valve as described is a very advantageous construction for, among other reasons, it enables a short over-all engine construction which will readily fit within the hood of a motor car, and admission of the air to the compression chamber and the exhaust of burnt gases from the combustion chamber may be controlled by a slide valve movement which is independent of the controlling of the compressed air discharge port and the compressed air admission port. The valves may be timed to maintain them substantially wide open a sufficient length of time to permit the admission and discharge of full charges.

Figure 3:
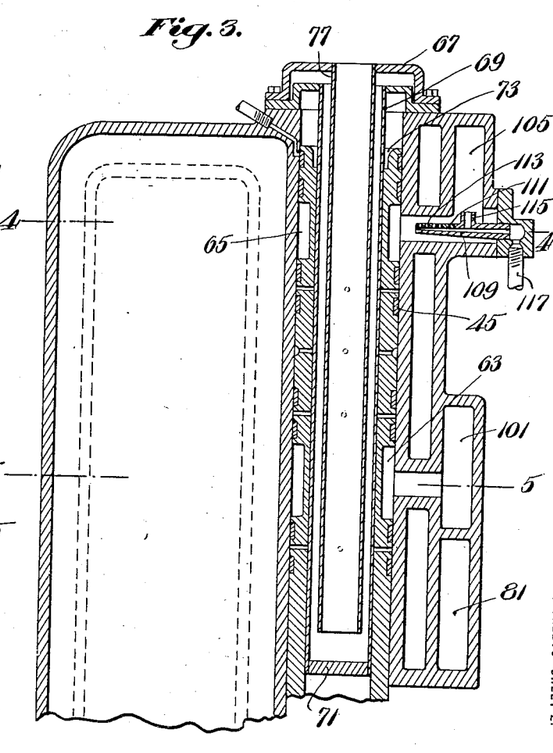
Fig. 3 is a vertical section taken on line 3—3 of Fig. 2.

Next will be described the construction for admitting air and gasolene or other fuel to the engine. The air is admitted through the interior of the tubular slide valves described. This serves the desirable dual function of cooling the valves and raising the temperature of the admitted air. To accomplish this a header 67 (Figs. 1, 2 and 3) is connected to the top of the valve containing valve casing 29, referred to. Depending from the lower wall of the header 67 are sleeves 69 fitting within and extending nearly the length of the tubular valves and having their lower ends closed by plugs 71. These sleeves are not fitted tightly within the valve tubes, but they have a free sliding fit. They are utilized to conduct oil to lubricate the inner surfaces of the valve-tube receiving cylinders 31. To facilitate this the upper ends of the valve-tubes are counterbored to present funnel-like recesses 73 in which oil may be introduced by a forced feed in any appropriate manner. This oil will gravitate downward between the valve tubes and the sleeves 69 and be conducted thence to the inner surfaces of the cylinders 31 through ducts 75 distributed at appropriate intervals in said tubes. This is an advantageous construction since the oil may be fed to the surfaces through a cooler path than if conducted through the hot walls of the working cylinders.

Depending from the upper wall of the header 67 are sleeves 77 smaller in diameter than the sleeves 69 referred to, thereby providing an annular passage between them. The sleeves 77 are open at their upper ends and at their lower ends, the latter terminating short distances from the plugs 71 which close the lower ends of the sleeves 69.

On the suction strokes of the air compressing pistons 11 air will be drawn from the outside atmosphere downwardly into the sleeves 77, thence upward through the annular spaces between the sleeves 77 and 69 to the chamber within the header 67. It is conducted thence through a passage in a casting 79 (Fig. 6) fastened to the valve casing 29. The air is conducted thence into a passage 81 (Fig. 1) leading to the main valve circumferential groove 37 which controls the admission of the air through the port 21 into the air compression chamber. The passage 81 extends the length of the engine and serves to supply air to all of the cylinders of the engine in a similar manner to that just described.

To regulate the quantity of air admitted a valve 83 (Fig. 6) is introduced in the passage in the casting 79. This valve as shown herein is in the form of a vane mounted on a shaft 85 journaled in bearings in the casting 79 and adapted to be rocked to vary the opening of the valve by a crank 87 connected by a link 89 with a rocking lever 91 fulcrumed intermediate its ends on a shaft 93 suitably mounted on a bracket connected to the engine. The lever 91 has an upper free end which serves as a follower for a cam 95 (Fig. 13) splined on a throttle shaft 97 which may be turned and held in different positions of adjustment by a toothed segment 99 fast on said shaft and a worm 99$^a$ having a hand wheel 99$^b$. The cam 95 may be variously formed as required. As shown herein it is arranged to rock the lever 91 slightly on initial contra-clockwise movement of the cam and to a greater extent in the course of further rocking movement of said cam in the same direction. Since the air supplied to the compression chambers must all pass the valve 83, the adjustment of the latter will provide a desired nicety of control over the supply of air.

On each downward movement of the pistons air is drawn into the compression chamber and on each upward movement of said pistons the air is compressed and forced outward through the discharge ports 23 as controlled by the main and auxiliary valve grooves 39 and 63. The air is conducted from said compression chambers through a passage 101 (Figs. 3 and 5) conveniently formed in the manifold 29. The passage 101 communicates with a chamber 103 (Figs. 4 and 5) which serves as a reservoir for receiving the compressed air. The compressed air is conducted from this reservoir through a passage 105 also formed in the manifold 29 to mixing chambers 107 which communicate with the grooves 65 and 41 of the differential and main valves for controlling the admission of the explosive mixture through the ports 25 into the combustion chambers of the cylinders.

Next will be described the means for supplying the gasolene or other fuel to the mixing chambers 107. To accomplish this nozzles 109 are introduced into said chambers. As shown herein they are fan-shaped, flaring inwardly toward the auxiliary valves. Each nozzle is provided with a cap plate 111 (Fig. 7) secured thereon in which are a multiplicity of small perforations 113. Substantially centrally of the nozzle is an air inlet 115 for a purpose to be described. To supply gasolene to these nozzles they are connected by branch pipes 117 (Fig. 3) with an outlet 119 of a pump 121 (Fig. 6) adapted to receive gasolene through an inlet 123 at the lower end of said pump from a tank or other appropriate source of supply unnecessary to show herein.

Figures 6, 13:
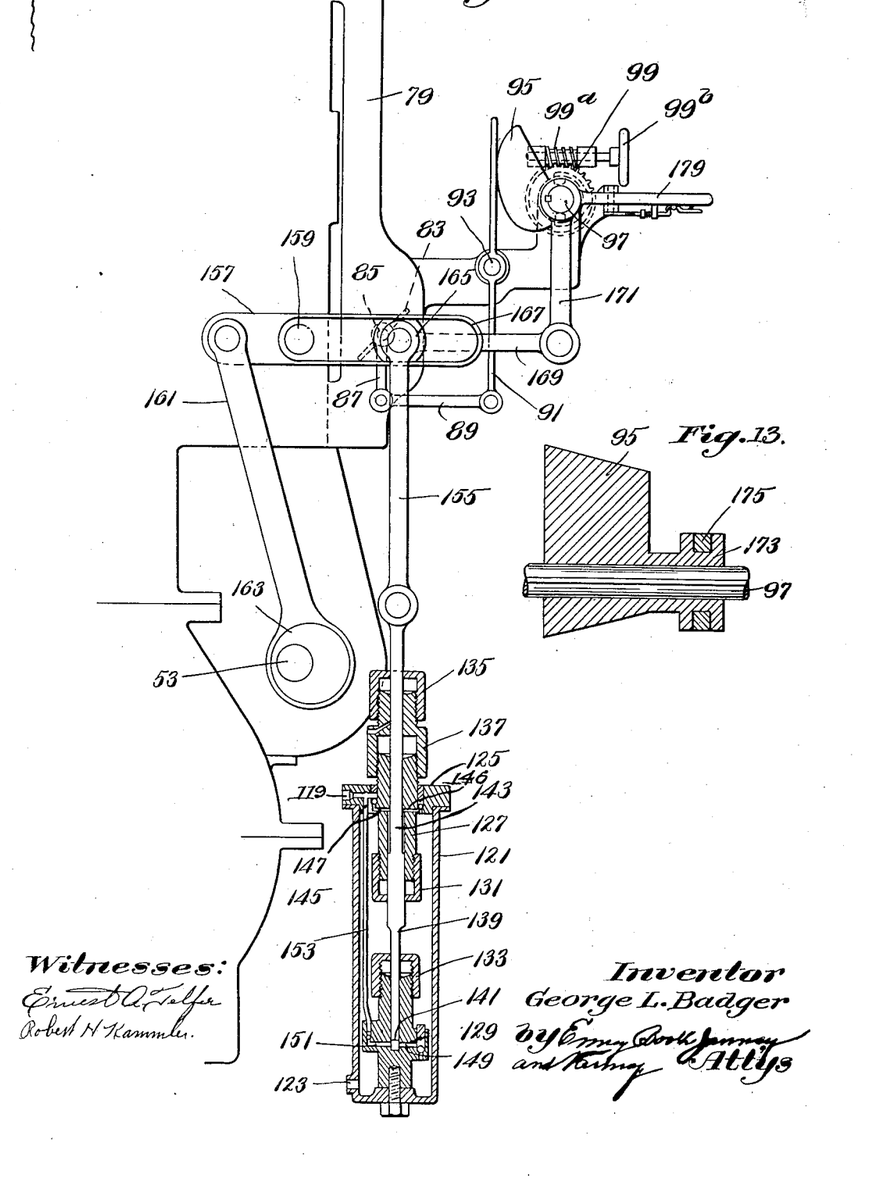
Figure 8:
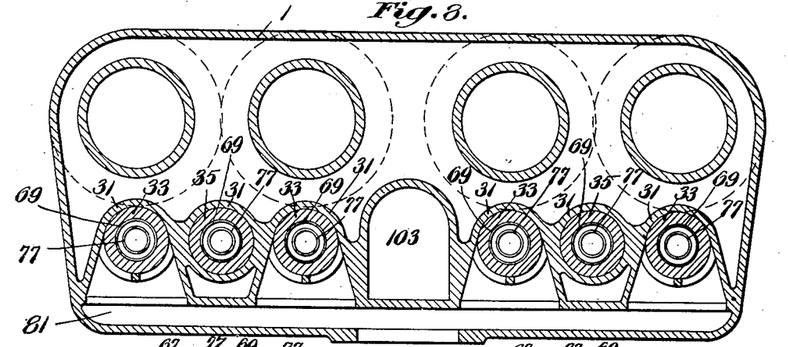
Fig. 8 is a horizontal section taken on line 8—8 of Fig. 1.

This pump comprises a cylinder having a closed lower end and an upper end receiving a head 125 secured thereto. Depending from said head is a cylinder 127 and projecting upward from the lower end of the cylinder is a cylinder 129. The upper cylinder has a stuffing box 131 and the lower cylinder has a stuffing box 133. On the outer end of the head 125 are a pair of stuffing boxes 135 and 137 to prevent any possibility of leakage from the cylinder 127. A plunger 139 reciprocates in the cylinders 127 and 129 and is formed to present a solid reduced end 141 for the lower cylinder and a reduced portion 143 providing an annular space between it and the cylinder 127 having a cross sectional area substantially equal to the cross sectional area of the bore of the lower cylinder 129.

The upper cylinder has an inlet port 146 communicating with the interior of the pump casing and a discharge port 147 communicating with the outlet 119, referred to. The lower cylinder has an inlet port 149 communicating with the interior of the pump casing and a discharge port 151 communicating with a pipe 153 connected to the delivery pipe 119. The ports for the cylinders are provided with usual ball check valves which are normally held on their seats by gravity. The plunger 139 is connected by a rod 155 with a lever 157 fulcrumed intermediate its ends on a pin 159 projecting from the engine casing. One end of the lever 157 is connected by a rod 161 with an eccentric 163 fast on the valve shaft 53, referred to.

By the pump construction described the rotation of the valve shaft will operate through the eccentric and the connections described and thereby impart reciprocation to the pump plunger 139. When this plunger moves upward it will automatically open the valve to the inlet port 149 of the lower cylinder and draw gasolene from the pump casing into the lower cylinder. When the plunger moves downward the gasolene thus drawn in the pump will be forced outward through the port 151 past the check valve therein, through the pipe 153, thence through the outlet 119 and pipes 117 to the nozzles 109.

When the pump moves downward it also draws from the pump casing a supply of gasolene past the check valve through the inlet port 146 for the upper cylinder and into the annular space therein. When the plunger moves upward the gasolene in said space will be forced out through the discharge port 147 past the valve therein and thence through the pipes 119 and 117 to the nozzles 109.

Thus the pump will discharge gasolene therefrom both on the downward and upward movements of its plunger and thereby operates continuously to deliver gasolene to the nozzles.

The gasolene receiving spaces in the upper and lower cylinders of the pump are of a predetermined size designed to deliver predetermined charges of the fuel to the nozzles. The volume of these charges, however, will depend upon the length of the stroke of the pump plunger. Means is provided for varying the stroke of said plunger according to the supply desired. To accomplish this the rod 155 (Fig. 6) is adjustably connected to the lever 157 to vary its distance from the fulcrum 159 of the latter. As shown herein, the rod 155 is connected to a cross-head 165 adapted to slide in a guideway 167 formed in said lever. This cross-head is connected by a link 169 with a crank 171 fast on the throttle shaft 97 referred to.

When the throttle shaft is rocked to adjust the air valve 83, it will also adjust the head 165 and thereby vary the distance of said head from the lever fulcrum 159 and vary the length of the pump stroke. The connections to the air valve and the connections to the pump may be designed and proportioned to provide a predetermined ratio of adjustment between the air valve and the pump stroke and this ratio may be maintained as the air valve is varied and as the gasolene supply is varied.

In some cases it may be desirable to vary this ratio. This may be readily accomplished by forming the cam 95 with an extensive surface tapering axially toward the shaft 97. By adjusting the cam longitudinally of said shaft its effect on the air valve obviously will be varied. To permit this adjustment said cam is formed to present a boss 173 having a groove 175 therein receiving the forked end of a crank 177 adapted to be operated and held in different positions by a handle 179. By the construction described gasolene and compressed air are delivered to the mixing chambers 107. The air in the course of its transit to these chambers becomes heated first in the source of its cooling the valve tubes and second by virture of its compression. The slug of gasolene contained in each nozzle is not at once vaporized by this heated air, however, since the compression of the latter causes the gasolene to remain in liquid form. As soon as the admission valve to a combustion chamber is opened the pressure of the air falls somewhat owing to the lower pressure in said chamber. This causes the air to rush from the mixing chambers toward the combustion chamber and simultaneously with the reduction in pressure referred to the slug of gasolene in the nozzle vaporizes and is disseminated into the air producing an excellent thorough mixture. The nozzles extend into the discharge passages of the mixing chambers and block the same somewhat, which, combined with the contraction of said passages, tend to increase the velocity of the compressed air in its passage therethrough. The air sweeping past the nozzles at high speed on the opening of communication to the combustion chambers causes the air to suck out of said nozzles the slugs of gasolene therein. Merely a quantity equal to the volume of the nozzle is withdrawn. To insure this the air inlet 115 referred to for the nozzle is provided. This permits the air to enter the nozzle back of the portion thereof containing the discharge perforations and thus the air cleans the gasolene out of the portion of the nozzle forward of said inlet.

From the above discussion it is thought the operation of the engine will be apparent. As stated, as shown herein it is of the two stroke cycle type so that each piston has a power stroke for each complete rotation of the crank shaft.

The engine may be provided with appropriate water jacket passages 185, 187 and 189 for cooling the same.

Figure 9:
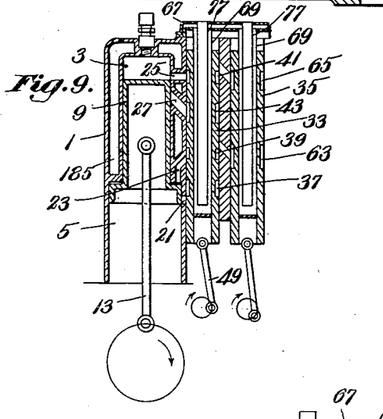
Figs. 9, 10, 11 and 12 on a reduced scale are views showing the positions of the pistons and valves relative to the parts of the cylinder during different events in the cycle.
Figure 10:
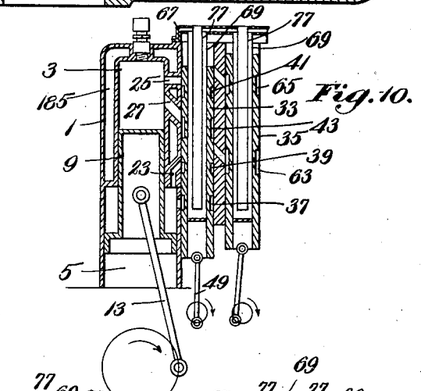

Referring more particularly to Figs. 9, 10, 11 and 12, the cycle of operations of the piston for one of the cylinders and its valves will be described. In Fig. 9 the piston is shown at the upward limit of its stroke. The main valve groove 41 is in communication with the port 25 but is closed from communication with the auxiliary valve groove 65. The compressed mixture in the combustion chamber is then exploded and the piston moves downward and effects a power stroke. In Fig. 10 the piston is shown half way in its downward movement. In the meantime it has uncovered the inner end of the exhaust port 27 and when near the end of its stroke will permit the escape of the burnt gases through the main valve groove 43. Also the piston has uncovered the air inlet port 21 and the main valve groove 37 has been brought in registration with said port, permitting air to be drawn into the compression chamber.

Figure 11:
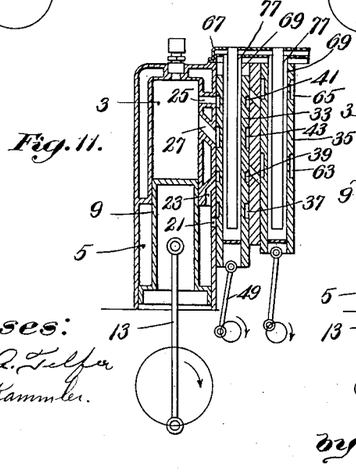
Figure 12:
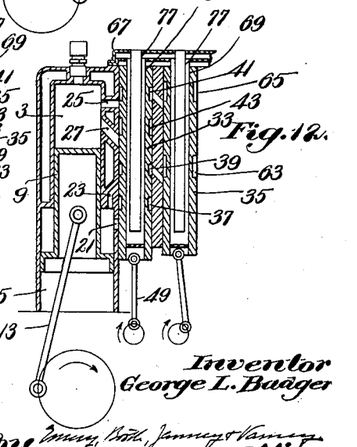

In Fig. 11 the piston is shown in the downward limit of its stroke. The main piston groove 37 is now closed from the inlet port 21 and the main and auxiliary valve grooves 39 and 63 are in communication with the discharge port 23. The exhaust port is still open. The piston now moves upwardly to the position shown in Fig. 12, thereby compressing and forcing out the air from the compression chamber through the port 23. The main and auxiliary valves are about to move downward so that when the piston reaches the top of the exhaust port 27 the main and auxiliary valves are open and a charge of compressed air with gasolene mixed therewith is admitted into the combustion chamber. Then the piston moves on past the top of the exhaust port 27 to the upper limit of its stroke as shown in Fig. 9. In the course of this movement it further compresses the charge which has been admitted into the combustion chamber and compensates for any loss of compression which may have resulted from the passage of the compressed air into the combustion chamber.

Having described one illustrative embodiment of the invention without limiting the same thereto, what I claim as new and desire to secure by Letters Patent is:

1. An internal combustion engine comprising in combination, a pair of cylinders, each cylinder having compression and combustion chambers therein and provided with inlet and discharge ports for each compression chamber, and admission and exhaust ports for each combustion chamber, a piston in each cylinder, a valve for each cylinder adapted to control the exhaust from each combustion chamber and the admission to each compression chamber, and an auxiliary valve member adapted to coöperate with said first mentioned valves to control the passage of fluid from said compression chambers to the respective combustion chambers.

2. An internal combustion engine comprising in combination, a pair of cylinders having exhaust and admission ports therein, pistons for said cylinders, a main valve for each of said cylinders adapted to control said exhaust port, and a mechanically operated auxiliary valve member coöperating with both of said main valves for controlling said admission port.

3. An internal combustion engine comprising in combination, a pair of cylinders having compression and combustion chambers with inlet and discharge ports, and fuel admission and exhaust ports, pistons for said cylinders, a main valve for each of said cylinders adapted to control said inlet and exhaust ports, and an auxiliary valve member coöperating with the main valves for controlling said admission and discharge ports.

4. An internal combustion engine comprising in combination, a pair of cylinders having compression and combustion chambers with inlet, discharge, admission and exhaust ports therein, pistons in said cylinders, a main piston valve for each of said cylinders for controlling said inlet and exhaust ports, and an auxiliary piston valve member coöperating with both of said main piston valves for controlling said discharge and admission ports.

5. An internal combustion engine comprising in combination, a cylinder having compression and combustion chambers, a storage chamber communicating with said compression and combustion chambers, inlet and discharge ports for said compression chamber and admission and exhaust ports for the combustion chamber, and a pair of differentially movable tubes having sets of circumferential grooves therein for controlling the passage of compressed fluid to the storage chamber and the passage of the compressed fluid from the storage chamber to the combustion chamber.

6. An internal combustion engine comprising a cylinder having ports therein, a manifold communicating with the cylinder, a piston in the cylinder, means for controlling the ports including an elongated tubular valve having partition means therein extending substantially the length of the valve for conducting a cooling medium therethrough to said manifold and cylinder.

7. An internal combustion engine comprising a cylinder having ports therein, a piston in said cylinder, and means for controlling the ports including a hollow valve, and means for conducting air to the cylinder longitudinally first downward and then upward through the interior of the valve.

8. An internal combustion engine comprising a cylinder having ports therein and compression and combustion chambers, piston means for the cylinder, means for controlling the ports including an elongated tubular valve, and a tube therein forming passages for conducting fluid to the compression chamber longitudinally in each direction through the valve.

9. An internal combustion engine comprising a cylinder having ports therein, piston means for said cylinder, and means for controlling said ports including coöperating main and auxiliary tubular valve members, and means providing passages within and extending longitudinally of each of said members for conducting fluid to the engine.

10. An internal combustion engine comprising a plurality of cylinders, their ports and pistons, a valve casing adjacent said cylinders, a series of hollow elongated valve members in said casing for controlling the ports, a plurality of tubular members projecting into each of said hollow elongated valve members for conducting fluid to the cylinders longitudinally through said hollow valve members.

11. An internal combustion engine comprising in combination, a cylinder having compression and combustion chambers, a piston for the cylinder, a reservoir, passage means for conducting compressed fluid from said compression chamber to said reservoir, passage means for conducting fluid from said reservoir to said combustion chamber, means for controlling said passages, including a valve and a tube therein forming passages for conducting fluid to the compression chamber.

12. An internal combustion engine comprising in combination, a cylinder, a piston working therein, means connected with said piston to supply compressed fluid, means to regulate the supply of fluid to said compressed fluid supply means, means to furnish a continuous supply of fuel, means for mixing said fuel and compressed fluid, and means for supplying the compressed mixture of fluid and fuel to the cylinder.

13. An internal combustion engine comprising in combination, a cylinder, a piston working therein, means to supply compressed fluid, means to supply preheated fluid to said compressing means, fuel forcing means for furnishing a continuous supply of fuel, means for regulating the amount of fuel supplied, means for mixing said fuel and compressed fluid, and means for supplying the compressed mixture of fluid and fuel to the cylinder.

14. An internal combustion engine comprising in combination, a cylinder, a piston working therein, means to supply compressed fluid, means for regulating the amount of fluid supplied to said compressed fluid supplying means, means to furnish a continuous supply of fuel, means for regulating the amount of fuel supplied, means for mixing said fuel and compressed fluid, and means for supplying the compressed mixture of fluid and fuel to the cylinder.

15. An internal combustion engine comprising in combination, a cylinder, a piston therein, means for supplying compressed fluid, means for regulating the amount of fluid supplied, means for supplying a continuous supply of fuel, means for regulating the amount of fuel so supplied, means for mixing said fuel and compressed fluid, means for supplying the compressed mixture of fluid and fuel to the cylinder, and means for simultaneously varying in a predetermined ratio the supply of fluid and fuel.

16. An internal combustion engine comprising in combination, a cylinder, a piston therein, means for supplying compressed fluid, means for regulating the amount of fluid supplied, means for supplying a continuous supply of fuel, means for regulating the amount of fuel so supplied, means for mixing said fuel and compressed fluid, means for supplying the compressed mixture of fluid and fuel to the cylinder, means for simultaneously varying in a predetermined ratio the supply of fluid and fuel and means to vary the said ratio of fluid and fuel.

17. An internal combustion engine comprising in combination, a plurality of cylinders having compression and combustion chambers, pistons for said cylinders, a casing adjacent the cylinders, a reservoir, passage means for conducting fluid from the compression chambers to the reservoir, passage means for conducting fluid from the reservoir to the combustion chambers, tubular valves adapted to reciprocate in the casing for controlling the passage of fluid to and from the cylinders, sleeves projecting into the tubular valves, ports in the sleeves, and means for delivering lubricating oil between the valves and sleeves and outward through the ports.

18. An internal combustion engine comprising in combination, a cylinder, a piston therein, means for supplying compressed fluid, means including a throttling valve for regulating the amount of fluid supplied, means to furnish a continuous supply of fuel, means for mixing the fuel and compressed fluid, means for supplying the mixture of compressed fluid and fuel to the cylinder, means for regulating the amount of fuel supplied, and means for varying in a predetermined ratio the amount of compressed fluid and fuel supplied.

19. An internal combustion engine comprising, in combination, a cylinder, a piston therein, a reservoir, means for supplying compressed fluid to the reservoir, a passage for conducting the fluid from the reservoir to the cylinder, fuel forcing means for furnishing a continuous supply of fuel to said passage, means for mixing the fuel and compressed fluid, and means for regulating the amount of fuel supplied.

20. An internal combustion engine comprising in combination, a cylinder having compression and combustion chambers, a piston for the cylinder, a reservoir, a passage for conducting fluid from the compression chamber to the reservoir, a passage for conducting fluid from the reservoir to the combustion chamber, a tubular slide valve for controlling the passage of fluid, and means for conducting lubricating oil to the exterior surface of the valve including a tube projecting into the valve.

21. An internal combustion engine comprising in combination, a plurality of cylinders, pistons therefor, means for supplying compressed fluid, means to furnish a continuous supply of fuel, means for mixing the compressed fluid and fuel, and means including coöperating slide valves for supplying the mixture of compressed fluid and fuel to each of the cylinders.

22. An internal combustion engine comprising in combination, a plurality of cylinders, pistons therefor, means for supplying compressed fluid, fuel forcing means for furnishing a continuous supply of fuel, means for mixing the compressed fluid and fuel, and means common to a plurality of cylinders for supplying the mixture of compressed fluid and fuel to each cylinder.

23. An internal combustion engine comprising in combination, a plurality of cylinders, pistons working therein, means for supplying compressed fluid, single double-acting fuel forcing means for furnishing a continuous supply of fuel, means for mixing the compressed fluid and fuel, and means for supplying the mixture of compressed fluid and fuel to the cylinders.

24. An internal combustion engine comprising in combination, a plurality of cylinders, pistons working therein, means connected with each of said pistons for supplying compressed fluid to a common container, fuel forcing means for furnishing a continuous supply of fuel, means for mixing the compressed fluid and fuel, means for supplying the mixture of compressed fluid and fuel to the cylinders, means to regulate the amount of fuel supplied, and means for varying in a predetermined ratio the amount of compressed fluid and fuel supplied to the cylinders.

25. An internal combustion engine comprising in combination, a plurality of cylinders, pistons working in said cylinders, means for supplying compressed fluid, means for furnishing a continuous supply of fuel, means for mixing the compressed fluid and fuel, a throttling valve for regulating the amount of fluid supplied, means for regulating the amount of fuel supplied, means for varying in a predetermined ratio the amount of compressed fluid and fuel supplied to the cylinders, and means for varying said ratio.

In testimony whereof, I have signed my name to this specification, in the presence of two subscribing witnesses.

GEORGE L. BADGER.

Witnesses:
HENRY T. WILLIAMS,
EVERETT S. EMERY.